(12) United States Patent
Low et al.

(10) Patent No.: US 12,325,127 B2
(45) Date of Patent: Jun. 10, 2025

(54) SERIAL MANIPULATOR FOR SPACE APPLICATIONS

(71) Applicant: SRI International, Menlo Park, CA (US)

(72) Inventors: Thomas P. Low, Belmont, CA (US); Brian Foster, San Carlos, CA (US); Brian K. McCoy, San Jose, CA (US)

(73) Assignee: SRI International, Menlo Park, CA (US)

(*) Notice: Subject to any disclaimer, the term of this patent is extended or adjusted under 35 U.S.C. 154(b) by 0 days.

(21) Appl. No.: 18/013,687

(22) PCT Filed: Aug. 2, 2021

(86) PCT No.: PCT/US2021/044202
§ 371 (c)(1),
(2) Date: Dec. 29, 2022

(87) PCT Pub. No.: WO2022/031609
PCT Pub. Date: Feb. 10, 2022

(65) Prior Publication Data
US 2023/0356388 A1 Nov. 9, 2023

Related U.S. Application Data

(60) Provisional application No. 63/061,053, filed on Aug. 4, 2020.

(51) Int. Cl.
*B25J 9/10* (2006.01)
*B25J 9/04* (2006.01)
*B25J 19/00* (2006.01)

(52) U.S. Cl.
CPC ............... *B25J 9/104* (2013.01); *B25J 9/042* (2013.01); *B25J 19/0004* (2013.01)

(58) Field of Classification Search
CPC ....... B25J 9/0078; B25J 9/104; B25J 19/0004
(Continued)

(56) References Cited

U.S. PATENT DOCUMENTS 4,218,173 A * 8/1980 Coindet ................. G05G 21/00
414/730
4,907,467 A 3/1990 Toyoda et al.
(Continued)

FOREIGN PATENT DOCUMENTS

CN 102371589 A * 3/2012
CN 111421566 7/2020
(Continued)

OTHER PUBLICATIONS

The International Search Report (ISR) with Written Opinion for PCT/US2021/044202 dated Sep. 28, 2021, pp. 1-10.

*Primary Examiner* — T. Scott Fix
(74) *Attorney, Agent, or Firm* — McDonnell Boehnen Hulbert & Berghoff LLP (57) ABSTRACT

Multi-segment manipulator arms are provided that exhibit improved performance in space applications, include reduced weight, reduced cost, reduced size, reduced rotational inertia, reduced vibration, improved heat dissipation characteristics, and increased reliability and on-station reparability. These manipulator arms transmit torque from a single motor at the base of the arm to each of the inter-segment joints via serial belts, rotationally linked via pulleys that are coaxial with the inter-segment joints. Brake(s) at each joint allow all but a selected joint to be fixed, allowing motor torque to be transmitted to the un-fixed joint, applying torque and/or rotation to the un-fixed joint. Placing the motor at the base facilitates heat management, reduces overall weight, and reduces total rotational inertia and weight of the arm segments.

20 Claims, 5 Drawing Sheets

(58) Field of Classification Search
USPC .......................................... 74/490.04; 901/21
See application file for complete search history.

(56) References Cited

U.S. PATENT DOCUMENTS

| | | | | |
|---|---|---|---|---|
| 6,324,934 | B1 * | 12/2001 | Monaghan | ........... B25J 19/0029 |
| | | | | 901/21 |
| 6,354,167 | B1 * | 3/2002 | Snow | ........................ B25J 9/104 |
| | | | | 414/744.5 |
| 2002/0078778 | A1 | 6/2002 | Grover et al. | |
| 2014/0008931 | A1 | 1/2014 | Kim et al. | |

FOREIGN PATENT DOCUMENTS

| | | | | |
|---|---|---|---|---|
| DE | 40 03 624 | | 10/1991 | |
| WO | WO-2019076146 A1 * | 4/2019 | .............. B25J 17/00 |

* cited by examiner

SERIAL MANIPULATOR FOR SPACE APPLICATIONS

CROSS-REFERENCE TO RELATED APPLICATION

This application claims priority to U.S. Provisional Patent Application No. 63/061,053, filed Aug. 4, 2020, which is incorporated herein by reference.

BACKGROUND

Unless otherwise indicated herein, the materials described in this section are not prior art to the claims in this application and are not admitted to be prior art by inclusion in this section.

Due to the cost of transport to orbit and other properties of the space environment (lack of convective or conductive heat rejection, lack of accessible mechanical 'ground' to dissipate vibration, excess momentum, etc.), space vehicles and other space systems are subject to stricter design constraints than systems designed for use on or within the Earth or the Earth's atmosphere, or on or within the body or atmosphere of other planets, moons, or other celestial bodies. These constraints result in space systems exhibiting reduced weight, including active or passive heat transmission and dissipation systems, including shock absorption systems to dissipate internal vibrations, including reaction wheels or other means to adjust/halt rotation, including means of shielding sensitive components from effects of radiation and energetic particle impacts, and other systems to provide specified performance despite the challenges of the space environment.

These considerations are especially evident in the design and operation of robotic manipulator systems. Thus, there is a need to provide improved means to dissipate heat from components located along the length of the manipulator, account for increased rotation/vibration due to the rotational inertia of the manipulator, and other issues.

SUMMARY

Some embodiments of the present disclosure provide a robotic arm system including: (i) a base member; (ii) a first arm segment, wherein the first arm segment is coupled to the base member via a first joint, wherein the first joint permits rotation, around a first axis, of the first arm segment relative to the base member; (iii) a first brake, wherein the first brake is operable to resist (or prevent) rotation of the first arm segment relative to the base member; (iv) a first hub, wherein the first hub comprises a first first-axis pulley, a second first-axis pulley, and a first-axis shaft, wherein the first-axis shaft rigidly couples the first first-axis pulley to the second first-axis pulley, and wherein the first first-axis pulley, the second first-axis pulley, and the first-axis shaft are coaxial with the first axis; (v) a first belt, wherein the first belt is in contact with the first first-axis pulley; (vi) a second arm segment, wherein the second arm segment is coupled to the first arm segment via a second joint, wherein the second joint permits rotation, around a second axis, of the second arm segment relative to the first arm segment; (vii) a second brake, wherein the second brake is operable to resist rotation of the second arm segment relative to the first arm segment; (viii) a second hub, wherein the second hub comprises a first second-axis pulley and a second-axis shaft, wherein the first second-axis pulley is rigidly coupled to the second-axis shaft, and wherein the first second-axis pulley and the second-axis shaft are coaxial with the second axis; and (ix) a second belt, wherein the second belt is in contact with the second first-axis pulley and with the first second-axis pulley.

Some embodiments of the present disclosure provide a method for operating a system, wherein the system includes: (i) a base member; (ii) a motor; (iii) a drive pulley, wherein the drive pulley is coupled to the motor such that the motor can apply torque to the drive pulley; (iv) a first arm segment, wherein the first arm segment is coupled to the base member via a first joint, wherein the first joint permits rotation, around a first axis, of the first arm segment relative to the base member; (v) a first brake, wherein the first brake is operable to resist rotation of the first arm segment relative to the base member; (vi) a first hub, wherein the first hub comprises a first first-axis pulley, a second first-axis pulley, and a first-axis shaft, wherein the first-axis shaft rigidly couples the first first-axis pulley to the second first-axis pulley, and wherein the first first-axis pulley, the second first-axis pulley, and the first-axis shaft are coaxial with the first axis; (vii) a first belt, wherein the first belt is in contact with the drive pulley and the first first-axis pulley; (viii) a second arm segment, wherein the second arm segment is coupled to the first arm segment via a second joint, wherein the second joint permits rotation, around a second axis, of the second arm segment relative to the first arm segment; (ix) a second brake, wherein the second brake is operable to resist rotation of the second arm segment relative to the first arm segment; (x) a second hub, wherein the second hub comprises a first second-axis pulley and a second-axis shaft, wherein the first second-axis pulley is rigidly coupled to the second-axis shaft, and wherein the first second-axis pulley and the second-axis shaft are coaxial with the second axis; and (xi) a second belt, wherein the second belt is in contact with the second first-axis pulley and with the first second-axis pulley. The method includes: (a) operating the first brake during a first period of time to resist rotation of the first arm segment relative to the base member; (b) during the first period of time, operating the motor to apply torque to the drive pulley, thereby causing the second arm segment to rotate relative to the first arm segment; (c) operating the second brake during a second period of time to resist rotation of the second arm segment relative to the first arm segment; and (d) during the second period of time, operating the motor to apply torque to the drive pulley, thereby causing the first arm segment to rotate relative to the base member.

Some embodiments of the present disclosure provide a robotic arm system including: (i) a base member; (ii) a first arm segment, wherein the first arm segment is coupled to the base member via a first joint, wherein the first joint permits rotation, around a first axis, of the first arm segment relative to the base member; (iii) a first brake, wherein the first brake is operable to resist rotation of the first arm segment relative to the base member; (iv) a first torque transmission element; (v) a second arm segment, wherein the second arm segment is coupled to the first arm segment via a second joint, wherein the second joint permits rotation, around a second axis, of the second arm segment relative to the first arm segment; (vi) a second brake, wherein the second brake is operable to resist rotation of the second arm segment relative to the first arm segment; (vii) a second torque transmission element; (viii) a first torque coupler, wherein the first torque coupler comprises a first-axis shaft, wherein the first torque coupler couples torque between the first torque transmission element and the second torque transmission element via the first-axis shaft, and wherein the first-axis shaft is coaxial with the first axis; and (ix) a second torque coupler, wherein the second torque coupler comprises a second-axis shaft, wherein the second torque coupler couples torque between the second torque transmission element and the second arm segment via the second-axis shaft, and wherein the second-axis shaft is coaxial with the second axis.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Multi-segment manipulator arms can be beneficially applied in a variety of applications. Such robotic manipulator systems can enable the manipulation of objects (e.g., to repair or assemble other systems, to interact with specimens in an environment), movement of the system relative to other systems/objects (e.g., to facilitate docking of a system including the arm with some other system or docking apparatus), or other applications. The size, weight, cost, moment of inertia, resistance to vibration, ability to transport waste heat, redundancy, or other factors of such a manipulator system can be specified relative to the intended applications of the system as well as the intended environment of the system and the properties of any host system that includes such a manipulator system (e.g., a micro-satellite intended to operate in low earth orbit or in some other space environment).

Operation in the space environment imposes stricter constraints on such a manipulator system and on host systems that include such manipulator systems. The lack of atmosphere complicates heat management, in some cases leading to the addition of active or passive heat dissipation via radiation (as heat rejection via convection is generally unavailable in a vacuum), as well as mechanisms for transporting heat from heat sources that are located along the length of a manipulator arm (e.g., motors) to heat sinking/rejection components located at the base of the arm or at some other location on/within a host system. Lack of contact with the Earth or with some other massive mechanical ground can also complicate dissipation of vibration, compensation for translation and/or rotational momentum transmitting into/along a manipulator arm, or other issues of motion or vibration, especially for low-mass host systems. Space systems are also highly constrained with respect to mass (e.g., related to the cost of transporting mass to orbit), reliability, and the ability to effect repairs, often resulting in the development of systems that are both multiply redundant and low-mass.

Robotic manipulator systems described herein provide improvements with respect to these factors by transmitting torques/rotations generated by a single motor to each of the joints of the arm. The motor can be located at the base of a multi-segment arm, reducing the mass and rotational inertia of the arm and simplifying control of the host spacecraft (e.g., by reducing the amount of rotational inertia generated by actuation of the arm) and also simplifying heat management by placing the motor near heat sinks or other heat management systems of a host system. Placing the motors, sensors and related control electronics at the base of a manipulator arm can also have benefits with respect to the mass and amount of shielding that is included to protect these components from radiation and high energy particle impacts. At least one brake is provided at each of the joints of the multi-segment arm. The brakes can be operated to prevent rotation of all but one of the joints, so that the motor can be used to exert rotations/torques at the non-braked joint. The single motor can thus be used to effect rotations/torques at all of the joints serially by braking and un-braking the joints.

Using a single motor at the base of the arm instead of multiple motors, each co-located at a respective manipulator joint, reduces the amount of heat generated by operation of said motors, simplifying heat management along the length of the arm. Such operation also allows for the use of resilient, low-cost, low-mass brakes like electrostatic brakes. Such operation also allows the arm to exert high rigidity when fully braked (i.e., when the brakes are operated to prevent all of the joints from rotating) or high compliance when none of the brakes are engaged (e.g., to facilitate initial contact with another system that is in motion relative to the arm and its host system).

Torque/rotation can be transmitted from the motor along the length of the arm in a variety of ways. Torque/rotation can be transmitted along each segment using belts, tension rods, or other torque transmission elements. Torque/rotation can be transmitted across the joints from one segment to the next using pulleys, gears, or other torque coupler mechanisms. In one example, a joint between two arm segments could include two pulleys rigidly connected via a shaft, all of which rotate about and are coaxial with an axis of rotation of the joint. A first belt, running along the length of a first segment (e.g., from another segment, or from the motor) engages with a first one of the pulleys while a second belt, running along the length of the other segment at the joint, engages with the other pulley (e.g., to transmit rotation/torque to yet another segment via additional pulley(s) or other mechanisms). When a brake at the joint prevents rotation of the joint, any rotations/torques exerted by the motor are transmitted through the joint via the pulleys and shaft. Alternatively, when the brake at the joint permits rotation of the joint and all other joints are in a locked condition, any rotations/torques exerted by the motor are exerted at the joint, thereby resulting in rotation of the segments relative to each other about the axis of the joint and/or exertion of torque between the segments across the joint. Such a belt-and-pulley implementation has the benefit of reducing backlash (e.g., relative to mechanisms that use gears or other torque coupler elements to transmit the torque/rotation between segments across the joints), as well as allowing belt tension to be easily adjusted on station.

Such systems provide a variety of benefits over 'tendon'-based under-actuated manipulator systems. Such systems are often limited with respect to the degree of rotation that can be exerted at any one joint, and are often also limited in their ability to exert torques in both directions at any given joint (e.g., "extension" torque is provided by springs or other passive elements, with motors or other active driving elements limited to exerting "flexion" torque only). In contrast, the systems described herein can be configured to provide multiple full rotations at each joint, and can exert torque in either direction at any joint.

Note that reference is made throughout this disclosure to "belts" which engage with "pulleys" to transmit rotations/torques between different elements along a multi-segment arm. However, these embodiments are intended as non-limiting examples for illustrative purposes. One of skill in the art will appreciate that a "belt" may include any flexible element capable of transmitting forces/torques along its length. Accordingly, a "belt" may include a chain, a single strip of flexible material, a strip of flexible material in which is embedded a number of straps or other longitudinal strengthening elements, a strip of flexible material in which is formed a plurality of teeth, a strip of flexible material to which a plurality of teeth are affixed, a continuous loop of chain or flexible material, a segment of chain or flexible material whose ends may be affixed to each other or to some other termination (e.g., to half-pulleys of a compound pulley), or some other functionally flexible torque and/or force-transmitting element(s). Similarly, a "pulley" may include any element(s) configured to transmit torque/rotation into/from such a "belt." Accordingly, a "pulley" may include a cylindrical pulley, a toothed pulley, a gear, or some other element(s) configured to rotate about an axis and the couple torques/rotations into/from a "belt."

Further, the term "member" (e.g., as in "input member") and "segment" (e.g., as in "arm segment" of a robotic arm system) are intended to have a broad meaning unless otherwise indicated. While such members may be illustrated by way of example herein as singular cast, machined, or otherwise formed plates, shafts, cowlings, or otherwise-shaped elements, it is intended that a "member" or "segment" may include multiple elements bolted, welded, screwed, clipped, press-fitted, or otherwise fastened together. The multiple elements of a "member" or "segment" may be bolted, press-fitted, or otherwise fastened together such that they are in intimate contact (e.g., such that large surfaces of such multiple elements of a single "member" or "segment" are in contact) or may be fastened together via intermediate additional elements of the member (e.g., via a set of rods, pins, cylinders, or screws that may pass through corresponding holes in some intervening member or other element of a device).

A "brake" is intended to include any mechanism configured to controllably reduce or stop, prevent, or otherwise resist the rotation or other motion of two or more elements (e.g., segments of a robotic arm) relative to each other. A brake may be configured to operate as a clutch, such that it is operated to either permit rotation while exerting minimal or no resistance to the rotation/motion, or to prevent all rotation/motion. A brake can include solenoid, piezoelectric actuators, electromagnetic coils, conductive plates, brake pads, clutch pads, electrostatic plates, motors, or other elements configured to allow the resistance of the brake to rotation or other motion to be electronically or otherwise controlled. For example, an electrostatic brake (or clutch) included a plurality of electrostatic plates or otherwise-configured electrodes that oppose each other across a dielectric (e.g., a dielectric coating deposited on one or both of the opposing electrodes) such that a high voltage applied across the opposing electrodes results in electrostatic attraction between the opposing electrodes, thereby preventing relative motion between the opposing electrodes. The braking capacity of such an electrostatic brake can be increased by increasing the surface area and/or number of the pairs of opposing electrodes. Such an electrostatic brake exhibits low mass, high efficiency, low power, high redundancy and reliability, low cost, and simplified driver circuitry making it useful for space applications. Further, the redundancy of such an electrostatic brake can be increased by separating sets of the electrodes into separately-driven, and possibly mechanically separate, "sub-brakes." Such a configuration can allow the brake to continue functioning (in a reduced fashion) even if one of the "sub-brakes" is non-functional (e.g., due to dielectric breakdown, failure of the driving circuitry, failure of wiring, ingress of particulates into the sub-brake).

II. Example Robotic Manipulator Mechanisms

Figure 1A:
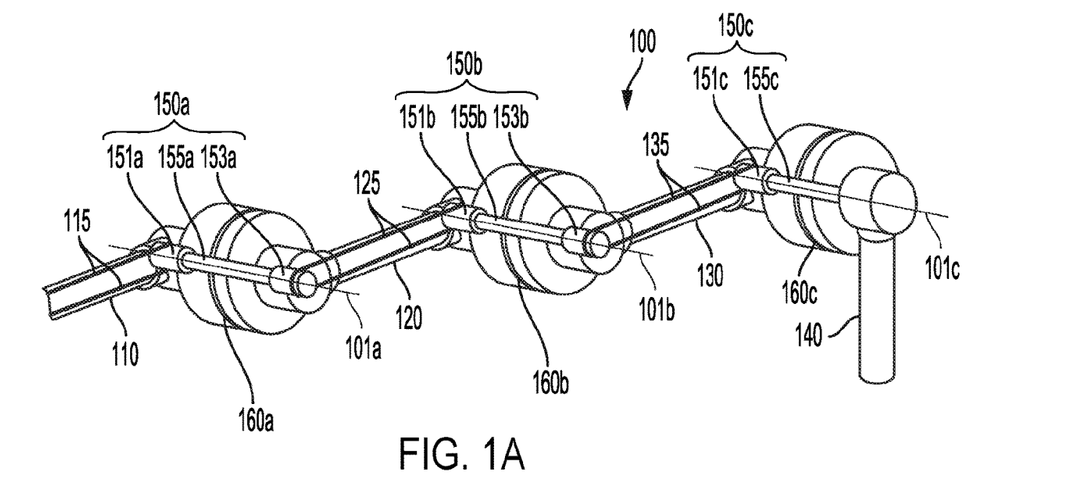
FIG. 1A illustrates elements of a robotic manipulator arm, in accordance with an example implementation.
Figure 1B:
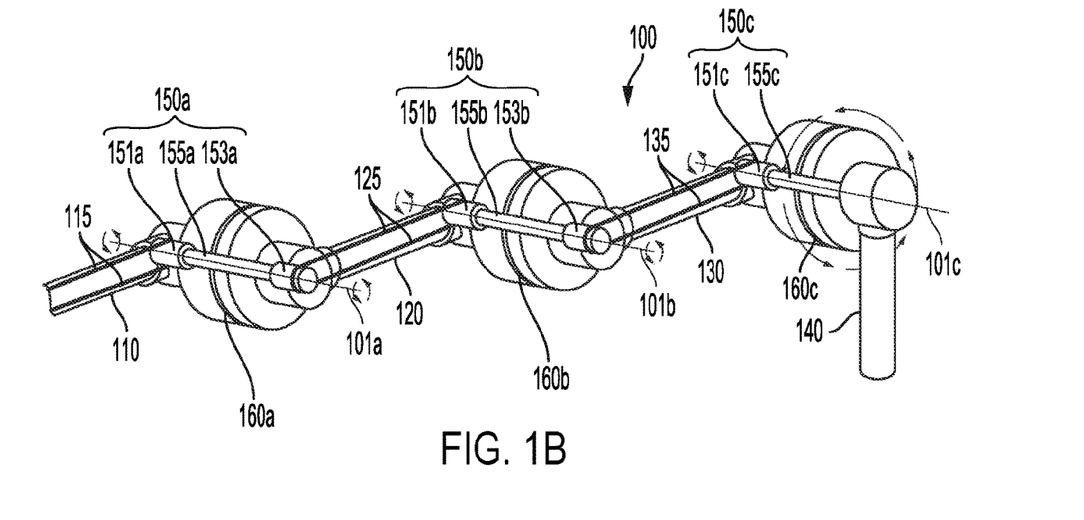
FIG. 1B illustrates elements of the robotic manipulator arm of FIG. 1A, in accordance with an example implementation.

FIGS. 1A and 1B depict an example robotic arm system 100. The robotic arm system 100 includes a base member 110 (which may be, e.g., rigidly coupled to a housing, frame, superstructure, or other element(s) of a host satellite or other host system), a first arm segment 120, a second arm segment 130, and a third arm segment 140. The particular configuration of the robotic arm system 100 is intended as anon-limiting example embodiment; a robotic manipulator system as described herein could, e.g., include more or fewer arm segments configured in a different manner than depicted in relation to FIGS. 1A and 1B.

The first arm segment 120 is coupled to the base member 110 via a first joint such that the first arm segment 120 can rotate about a first axis of rotation 101a relative to the base member 110. A first brake 160a is operable to prevent rotation of the first arm segment 120 relative to the base member 110. The second arm segment 130 is coupled to the first arm segment 120 via a second joint such that the second arm segment 130 can rotate about a second axis of rotation 101b relative to the first arm segment 120. A second brake 160b is operable to prevent rotation of the second arm segment 130 relative to the first arm segment 120. The third arm segment 140 is coupled to the second arm segment 130 via a third joint such that the third arm segment 140 can rotate about a third axis of rotation 101c relative to the second arm segment 130. A third brake 160c is operable to prevent rotation of the third arm segment 140 relative to the second arm segment 130.

A first hub 150a includes a first first-axis pulley 151a and a second first-axis pulley 153a that are coupled to each other via a first-axis shaft 155a. The first hub 150a is coaxial with the first axis of rotation 101a of the first joint (e.g., bearings or other elements maintain the location of the first hub 150a relative to elements of the base member 110 and/or first arm segment 120 such that, when the first hub 150a rotates, it rotates about an axis that is substantially coaxial with the first axis of rotation 101a of the first joint). The first first-axis pulley 151a is capable of being driven by a motor (not shown) driving a first belt 115 that is at least partially disposed within the base member 110 and that is in contact with the first first-axis pulley 151a.

A second hub 150b includes a first second-axis pulley 151b and a second second-axis pulley 153b that are coupled to each other via a second-axis shaft 155b. The second hub 150b is coaxial with the second axis of rotation 101b of the second joint (e.g., bearings or other elements maintain the location of the second hub 150b relative to elements of the first arm segment 120 and/or second arm segment 130 such that, when the second hub 150b rotates, it rotates about an axis that is substantially coaxial with the second axis of rotation 101b of the second joint). The first second-axis pulley 151b is capable of being driven by the second first-axis pulley 153a driving a second belt 125 that is at least partially disposed within the first arm segment 120 and that is in contact with the first second-axis pulley 151b and with the second first-axis pulley 153a.

A third hub 150c includes a first third-axis pulley 151c that is coupled to a third-axis shaft 155c. The third-axis shaft 155c could be rigidly coupled to a housing or other element(s) of the third arm segment 140 (e.g., in examples where the third arm segment is the terminal segment of the robotic arm system 100). Alternatively, the third-axis shaft 155c could be rigidly coupled to a pulley or other additional element(s) (not shown) of the third hub 150c to facilitate driving arm segments in additional to those shown in FIGS. 1A and 1B and/or to facilitate driving end-of-arm tools or other mechanical elements of the third arm segment 140. The third hub 150c is coaxial with the third axis of rotation 101c of the third joint (e.g., bearings or other elements maintain the location of the third hub 150c relative to elements of the second arm segment 130 and/or third arm segment 140 such that, when the third hub 150c rotates, it rotates about an axis that is substantially coaxial with the third axis of rotation 101c of the third joint). The first third-axis pulley 151c is capable of being driven by the second second-axis pulley 153b driving a third belt 135 that is at least partially disposed within the second arm segment 130 and that is in contact with the first third-axis pulley 151c and with the second second-axis pulley 153b.

FIG. 1A depicts the robotic arm system 100 during a period of time during which all of the depicted brakes 160a, 160b, 160c are being operated to resist rotation of the corresponding elements of the arm 100 about the first, second, and third joints, respectively. Accordingly, operating the motor to apply a torque to the arm (via the first belt 115) will not result in rotation or other movement of any of the depicted arm segments (though, if there are further arm segments in addition to those depicted, such applied torques may result in rotation of non-depicted additional arm segments about corresponding non-depicted additional joints of the arm 100).

To cause a rotation and/or apply a torque at a selected one of the joints of the robotic arm system 100, the brake for that selected joint can be operated to permit rotation of the corresponding segments about the selected joint (e.g., by discharging a high voltage applied to electrodes of the brake, thereby reducing the electrostatic attraction exerted by the electrodes onto each other) while the other brakes continue to resist rotation about their respective other joints. Any rotation/torque exerted by the motor will, while operating the brakes in this manner, result in a rotation/torque being realized at the selected joint.

Such a pattern of operation is depicted in FIG. 1B. FIG. 1B depicts the robotic arm system 100 during a period of time during which the first and second brakes 160a, 160b (and any additional non-depicted brakes of the arm 100) are being operated to resist rotation of the corresponding elements of the arm 100 about the first and second joints, respectively, while the third brake is operated to permit rotation of the third arm segment 140 about the third axis of rotation 101c relative to the second arm segment 130. Accordingly, operating the motor to apply a rotation to the arm (via the first belt 115) results in rotation of the third arm segment 140 out the third axis of rotation 101c relative to the second arm segment 130. This rotation is depicted by the curved arrows around the third axis of rotation 101c. This rotation is transmitted from the motor to the third arm segment 140 via rotation of the "upstream" hubs 150a, 150b about their respective axes of rotation 101a, 101b though the corresponding arm segments do not rotate about the respective axes of rotation (i.e., the first arm segment 120 does not rotate about the first axis of rotation 101a relative to the base member 110 and the second arm segment 130 does not rotate about the second axis of rotation 101b relative to the first arm segment 120).

The brakes and motor of the robotic arm system 100 can be operated in this manner, activating all the brakes of the arm 100 except the brake for a selected joint in order to develop a rotation/torque about the selected joint, in order to control the shape and location of the robotic arm system 100 and to use the robotic arm system 100 to manipulate objects and/or exert forces onto other systems (e.g., to effect docking between a host system that includes the arm 100 and a target satellite or other system). This could be done serially for each of the joints in turn. Each joint could be de-activated for less than a specified period of time (e.g., 2 milliseconds, 100 milliseconds, 200 microseconds, 100 nanoseconds), with control of each joint being performed serially in a repeated sequence (e.g., at a rate of alternation between joints between approximately 100 Hertz and 1000 Hertz) such that the operation of the robotic arm system 100 approximates the control of all of the joints simultaneously.

As noted above, the third hub 150c could be rigidly coupled to the third arm segment 140 in examples where the third arm segment 140 is the terminal segment of the robotic arm system 100. Alternatively, a further pulley, belt, and other elements could be included to facilitate driving additional arm segments beyond the third arm segment 140. In yet further embodiments, the third arm segment 140 could be the terminal arm segment but the third hub 150 could be coupled to further pulley(s), gears, impellers, brakes, or other components to facilitate the motor driving pumps, drills, screwdrivers, or other end-of-arm tooling or other systems disposed on or within the third arm segment 140.

As shown in FIGS. 1A and 1B, the axes of rotation of the joints of a robotic arm system (e.g., 100) as described herein can be substantially orthogonal to the long axes of the corresponding arm segments that meet at each of the joints. In this example, the second axis of rotation 101b is substantially orthogonal to the long axes of the first arm segment 120 and the second arm segment 130. However, this is only meant as a non-limiting example embodiment. In practice, gears, pulleys, torsion bars, or other elements can be employed such that any desired relationship between the axis of rotation of a joint and the long axes of the arm segment that are joined via the joint. For example, the axis of rotation of a joint could be substantially in the same direction as (e.g., within fifteen degrees of) the long axis of one or both of the arm segments that come together at the joint.

Figure 2:
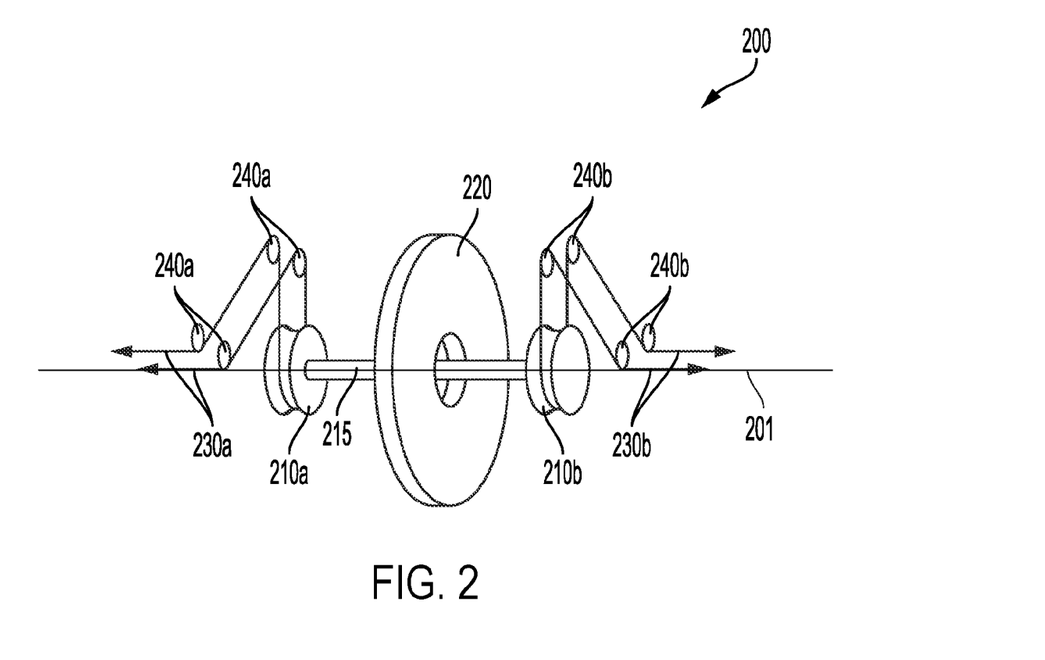
FIG. 2 illustrates elements of a robotic manipulator arm, in accordance with an example implementation.

FIG. 2 illustrates elements of an example robotic arm system 200 configured in such a manner. A joint between first and second arm segments (not shown) permit the first and second arm segments to rotate relative to each other about an axis of rotation 201. A brake 220 is electrically operable to prevent, stop, or otherwise resist such rotation. A hub that includes a first pulley 210a, a second pulley 210b, and a shaft 215 rigidly coupled together is coaxial with the axis of rotation 201 and traverses the joint. A first belt 230a is disposed at least partially within the first arm segment and is in contact with the first pulley 210a, allowing rotations and/or torques to be transmitted along the arm 200. A number of support pulleys 240a allow the first belt 230a to be redirected such that it can pass in the direction of the long axis of the first arm segment, in a direction (indicated by the arrows) that is parallel to the axis of rotation 201. A second belt 230b is disposed at least partially within the second arm segment and is in contact with the second pulley 210b, allowing rotations and/or torques to be transmitted along the arm 200. A number of additional support pulleys 240b allow the second belt 230b to be redirected such that it can pass in the direction of the long axis of the second arm segment, in a direction (indicated by the arrows) that is also parallel to the axis of rotation 201.

The brakes of a robotic arm system as described herein could be configured in a variety of ways to effect braking via a variety of different mechanisms. In some examples, the brakes could be electrostatic brakes that include a plurality of electrostatic plates or otherwise-configured electrodes that oppose each other across a dielectric (e.g., a dielectric coating deposited on one or both of the opposing electrodes). A high voltage applied across the opposing electrodes can result in electrostatic attraction between the opposing electrodes, thereby preventing relative motion between the opposing electrodes. The braking capacity of such an electrostatic brake can be increased by increasing the surface area and/or number of the pairs of opposing electrodes. Such an electrostatic brake exhibits low mass, high efficiency, low power, high redundancy and reliability, low cost, and simplified driver circuitry making it useful for space applications. The redundancy of such an electrostatic brake can be increased by separating sets of the electrodes into separately-driven, and possibly mechanically separate, "sub-brakes." Such a configuration can allow the brake to continue functioning (in a reduced fashion) even if one of the "sub-brakes" is non-functional (e.g., due to dielectric breakdown, failure of the driving circuitry, failure of wiring, ingress of particulates into the sub-brake).

Further, such electrostatic brakes can have incorporated therein elements configured to act as angle and/or torque sensors, facilitating control of a robotic arm system by providing a reliable, low-cost, low-weight system for detecting the state of the robotic arm system. For example, one or more of the electrodes of an electrostatic brake could be patterned such that a capacitance between the electrode(s) could be detected as a proxy for the angle of the corresponding joint of the arm. Alternatively or additionally, such "sensor electrodes" could be separate electrodes from those used to exert braking force.

As shown in FIGS. 1A, 1B, and 2, rotations and/or torques can be transmitted from a motor along a robotic arm system to a target joint using a series of belts and pulleys. However, other mechanisms are possible. For example, torsion rods could be employed in place of belts as torque transmission elements to transmit rotations/torques from one joint to the next along an arm segment. Additionally or alternatively, bevel gears, planetary gears, or other elements could be used as torque couplers to transmit rotation/torque from one arm segment to next, across intervening joints, such that braking an intervening joint allows the torque/rotation to be applied at another non-braked joint.

The use of the belt-and-pulley mechanisms described above as the torque transmission elements and joint-spanning torque couplers of a robotic arm system provides a variety of benefits. For example, such belt-and-pulley systems exhibit reduced backlash compared to, e.g., geared systems. Additionally, such belt-and-pulley systems can have reduced mass and cost relative to alternative solutions. Yet further, such systems can be made redundant with low additional mass, cost, and complexity by doubling (or tripling, etc.) the belts passing between the same two (or more) pulleys. Redundancy can also be provided in the single base motor by using multiple independent and independently-driven magnetic coils and multiple independent motor controllers, additional independent set(s) of windings, and/or including a full redundant motor. Such redundancy can be provided for lower mass, cost, and complexity than for manipulators that include a motor for each joint, as such systems require redundancy at each of multiple motors (rather than at a single motor, as in the presently described manipulator arms).

Figure 3A:
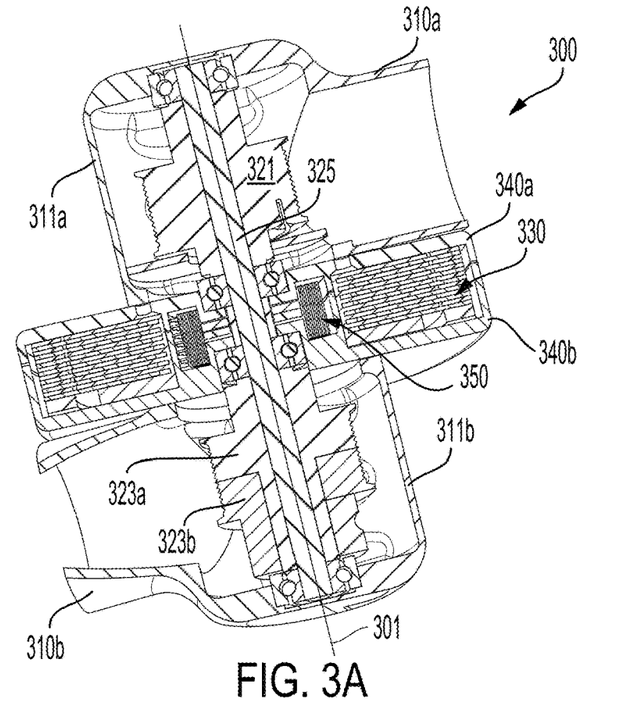
FIG. 3A illustrates, in cross-section, elements of a robotic manipulator arm, in accordance with an example implementation.
Figure 3B:
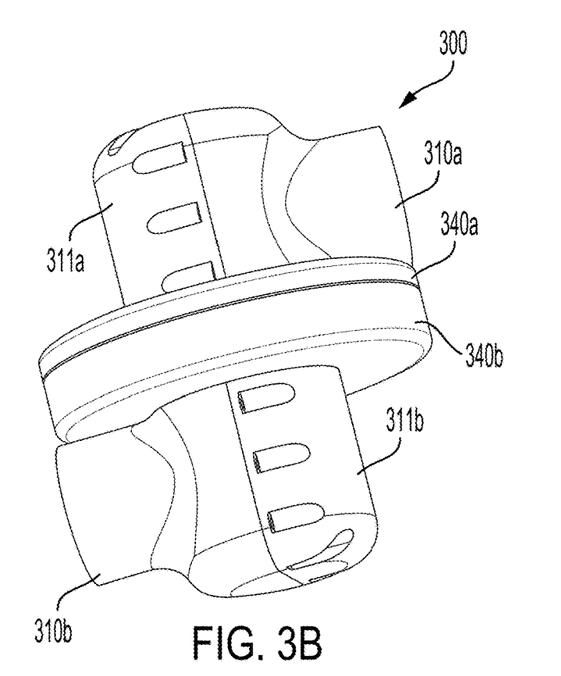
FIG. 3B illustrates, in cross-section, elements of the robotic manipulator arm of FIG. 3A, in accordance with an example implementation.

FIGS. 3A and 3B depict, in cross-sectional and external perspective views respectively, elements of a robotic arm system 300 that are associated with a particular joint of the robotic arm system 300. First 310a and second 310b arm segments of the system 300 are able to rotate relative to each other about an axis of rotation 301 of the particular joint. A hub includes a first pulley 321 coupled, via a shaft 325, to a second pulley composed of first 323a and second 323b half-pulleys. The elements of the hub are coaxial with the axis of rotation 301.

A first belt (not shown) contacts the first pulley 321 and extends along the first arm segment 310a. A second belt (not shown) contacts the half-pulleys 323a, 323b of the second pulley and extends along the second arm segment 310b. The second belt could be composed of a length of flexible material (e.g., chain, rubber, polymer with longitudinal strengthening straps disposed therein) whose first and second ends are fixed to the first half pulley 323a and the second half-pulley 323b, respectively. The tension in the second belt could then be adjusted by adjusting the relative angle between the half-pulleys 323a, 323b (e.g., by loosening one or more set bolts that fix the relative angles of the half-pulleys, then setting the angle between the half-pulleys to achieve the desired tension, and then tightening the set bolt(s)). This could be done to allow the tension in the belts to be easily adjusted on-station (e.g., as the belt(s) loosen due to age and/or use). Additionally or alternatively, tension in the belt could be maintained by a spring exerting torque between the half-pulleys 323a, 323b, though such an implementation could reduce the overall stiffness of the arm system.

The first and second arm segments 310a, 310b include respective removable covers 311a, 311b that are bolted or otherwise affixed to the rest of the first and second arm segments 310a, 310b. These covers allow for easy access to the belts, pulleys, bearings or other elements of the joint to facilitate inspection, assembly, and/or repair the robotic arm system 300 (e.g., to re-tension the belt, to replace the belt, bearings, or other components). Such covers, configured as depicted in FIGS. 3A and 3B, provide access to the moving parts of the joint when removed while providing protection to the joint's components, mechanical rigidity to the arm segments/joint, prevention of particles entering/exiting the joint, and other benefits when installed.

Rotation of the joint depicted in FIGS. 3A and 3B can be reduced or stopped by the operation of a brake 330. The brake 330 is an electrostatic brake that includes a plurality of opposing electrodes separated by dielectric material such that application of high voltages across the paired electrodes results in an attractive force between the pairs of electrodes. A first subset of the electrodes is mechanically coupled to the first arm segment 310a and a second subset of the electrodes is mechanically coupled to the second arm segment 310b such that this attractive electrostatic force, when present, reduces, prevents, or otherwise resists rotation of the first 310a and second 310b arm segments relative to each other about the axis of rotation 301. In some examples, the subsets of electrodes could be further sub-divided and driven by respective different wiring, driver circuitry, etc. to provide enhanced redundancy. In some examples, one or more of the electrodes could be patterned or otherwise configured to facilitate capacitive sensor or other methods of sensing the angle between the first 310a and second 310b arm segments at the joint. Additionally or alternatively, coils, conductive traces, optical patterns, or other features could be includes as part of the brake 330 to facilitate inductive, electrical, optical, resistive, or other some method of electrically sensing the angle and/or torque between the first 310a and second 310b arm segments at the joint.

The brake 330 is disposed within a protective housing that is made up of first 340a and second 340b segments that form part of the first 310a and second 310b arm segments, respectively. The housing provides protection to the brake 330 (e.g., from impacts, debris, etc). Further, the housing can prevent ingress of particles into the brake and egress of particles generated by the brake (e.g., particles of dielectric worn off of the electrodes by operation of the brake). The housing could include additional elements (e.g., seals) to prevent particulates from entering/exiting the housing.

Slip rings, cabling, or other elements could be used to transmit power and signals across a joint from one arm segment to the next in a robotic arm system as described herein. The robotic arm system 300 of FIGS. 3A and 3B includes a flat cable 350 (e.g., a flat cable composed of flexible printed circuit board materials) that encircles the shaft 325 of the hub a number of times. The inner end of the flat cable 350 is connected to cabling or other electronics in one of the arm segments while the outer end of the flat cable 350 is connected to cabling or other electronics in the opposite arm segments, thereby connecting electronics on either side of the joint to each other. This configuration allows for significant range of motion of the joint (e.g., multiple full rotations, depending on the length, thickness, or other properties of the cable) while providing reliable electrical contact. Further, such a configuration can allow for minimal or no wear or weakening of the cable through use, providing extended device operational lifetime before cable failure.

As described above, brakes of a robotic arm system may operate to either permit or resist rotation of arm segments relative to each other about a joint. Such operation could be timed to allow sequential actuation of individual joints at various different points in time. All of the brakes could be simultaneously activated to provide rigidity to the arm, or all of the brakes could be simultaneously deactivated to provide maximal compliance to the arm (e.g., during initial contact with another satellite or other system during docking of a host system with the other system). However, in some applications, it may be desirable to apply an intermediate level of braking to a joint of a robotic arm system, e.g., to provide a specified level of compliance to the arm in order to slow the movement of a target satellite or other object relative to the robotic arm and/or a host system thereof, to dissipate vibration in the robotic arm system, or to provide some other benefit.

In such examples, the brakes could be operated and/or configured to provide an intermediate level of opposition to joint rotation. This could be done by, e.g., providing an intermediate level of voltage to opposing electrodes of an electrostatic brake, or applying voltages to less than all of the electrode pairs of an electrostatic brake. Additionally or alternatively, separate braking systems could be provided in addition to the brake systems used to facilitate motion control of the arm as described above. For example, an additional electrostatic clutch or other electromechanical system could be coupled to a brake pad, eddy current brake, damper, spring, or other element(s) and operable to clutch the joint to the other element(s) to facilitate controlled application of the braking, damping, or other mechanical properties of the other element(s). In another example, the additional brake system could be an electronically switch eddy current brake.

III. Example Systems

Figure 4:
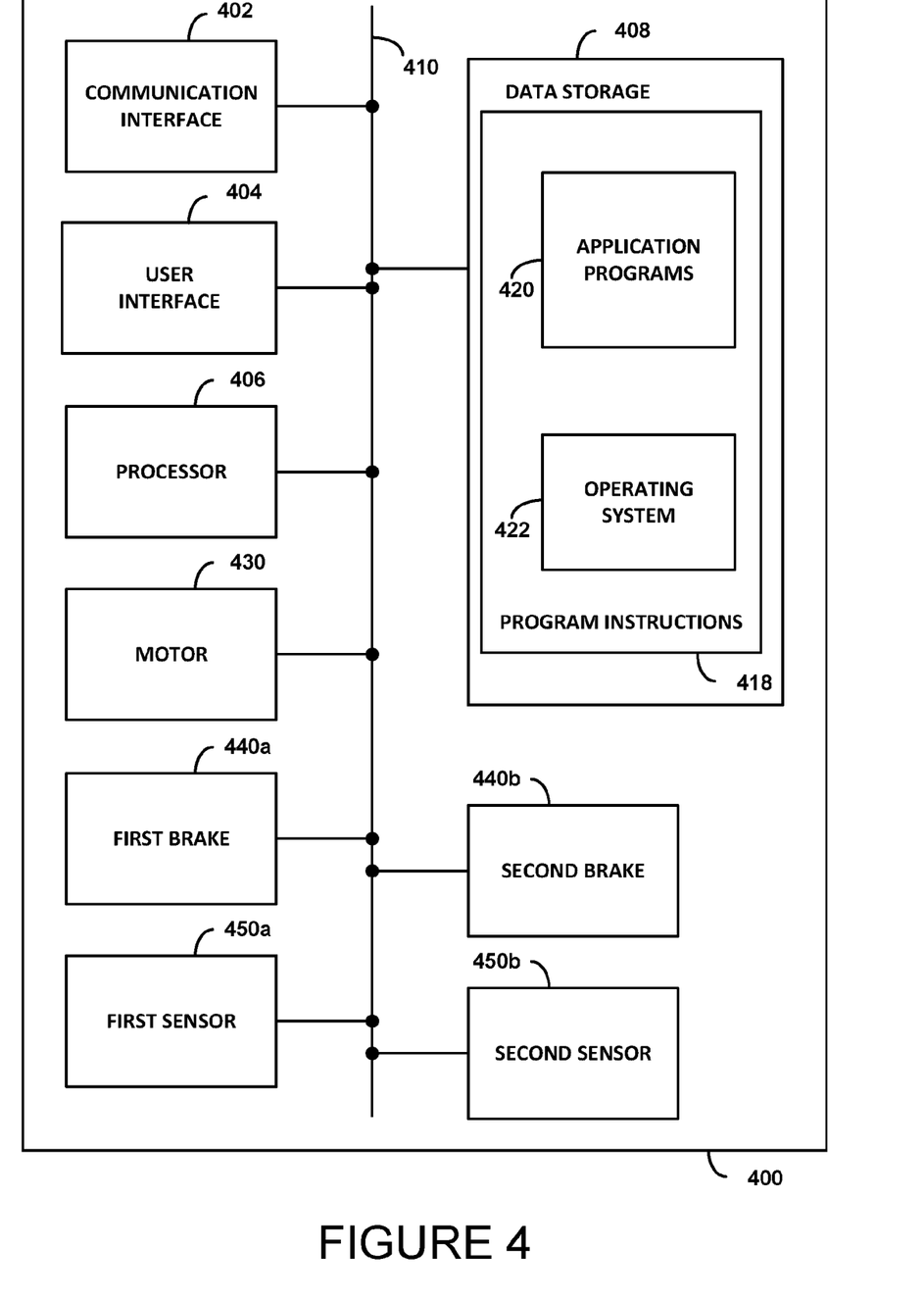
FIG. 4 depicts elements of an example system.

FIG. 4 illustrates an example system 400 (e.g., a satellite system or other space vehicle or system thereof) that may be used to implement the methods described herein. By way of example and without limitation, system 400 may be a robotic manipulator arm system (e.g., having standardized mechanical and electrical connection features to facilitate integration into standard space vehicle busses or other space- or terrestrial-based systems), a satellite, part of a rocket, spaceplane, or other vehicle configured to propel itself (e.g., from Earth into orbit, or between locations in space or in some other environment), or some other type of device or system.

As shown in FIG. 4, system 400 may include a communication interface 402, a user interface 404, a processor 406, a motor 430, a first brake 440a and a second brake 440b, a first sensor 450a and a second sensor 450b, and data storage 408, all of which may be communicatively linked together by a system bus, network, or other connection mechanism 410.

Communication interface 402 may function to allow system 400 to communicate, using analog or digital modulation of electric, magnetic, electromagnetic, optical, or other signals, with other devices, access networks, and/or transport networks. Thus, communication interface 402 may facilitate circuit-switched and/or packet-switched communication, such as plain old telephone service (POTS) communication and/or Internet protocol (IP) or other packetized communication. For instance, communication interface 402 may include a chipset and antenna arranged for wireless communication with a radio access network or an access point. Also, communication interface 402 may take the form of or include a wireline interface, such as an Ethernet, Universal Serial Bus (USB), inter-integrated circuit (I2C), and/or serial peripheral interface (SPI) interconnection. Communication interface 402 may also take the form of or include a wireless interface, such as a Wifi, BLUETOOTH®, or wide-area wireless interface (e.g., WiMAX or 3GPP Long-Term Evolution (LTE)). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH® interface, and a wide-area wireless interface).

In some embodiments, communication interface 402 may function to allow system 400 to communicate with other devices, remote servers, access networks, and/or transport networks. For example, the communication interface 402 may function to receive commands to operate a robotic arm of the system 400. Such commands could take the form of low-level commands to individual components of the arm (e.g., actuate the brakes 440a, 440b in a particular manner, exert a specified rotation/torque with the motor 430), higher level commands that could be interpreted and implemented by the processor 420 (e.g., rotate a specified joint to a specified angle, move the endpoint of the arm to a specified location), and/or high-level commands that might require the processor 420 to generate, sense, or receive additional information (e.g., dock with an incoming space vehicle). The communication interface 402 may function to transmit information to other systems (e.g., to transmit confirmation that a command was received and/or accomplished, to transmit information about the state of a robotic arm and/or outputs of the sensor(s) 450a, 450b). The communication interface 402 could be used to receive programming updates.

User interface 404 may function to allow system 400 to interact with a user, for example to receive input from and/or to provide output to the user related to the status or operation of a robotic arm system. Thus, user interface 404 may include input components such as a keypad, keyboard, touch-sensitive or presence-sensitive panel, computer mouse, trackball, joystick, microphone, and so on. User interface 404 may also include one or more output components such as a display screen which, for example, may be combined with a presence-sensitive panel. The display screen may be based on CRT, LCD, and/or LED technologies, or other technologies now known or later developed. User interface 404 may also be configured to generate audible output(s), via a speaker, speaker jack, audio output port, audio output device, earphones, and/or other similar devices.

Processor 406 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of image processing, image alignment, image decoding/encoding, and combining images, among other applications or functions. Data storage 408 may include one or more volatile and/or non-volatile storage components, such as magnetic, optical, flash, or organic storage, and may be integrated in whole or in part with processor 406. Data storage 408 may include removable and/or non-removable components.

Processor 406 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by system 400, cause system 400 to carry out any of the methods, processes, or functions disclosed in this specification and/or the accompanying drawings. The execution of program instructions 418 by processor 406 may result in processor 406 using data 412.

By way of example, program instructions 418 may include an operating system 422 (e.g., an operating system kernel, device driver(s), and/or other modules) and one or more application programs 420 (e.g., motor driver functions, operational history data, robotic arm control data, robotic arm calibration data) installed on system 400.

IV. Example Methods

Figure 5:
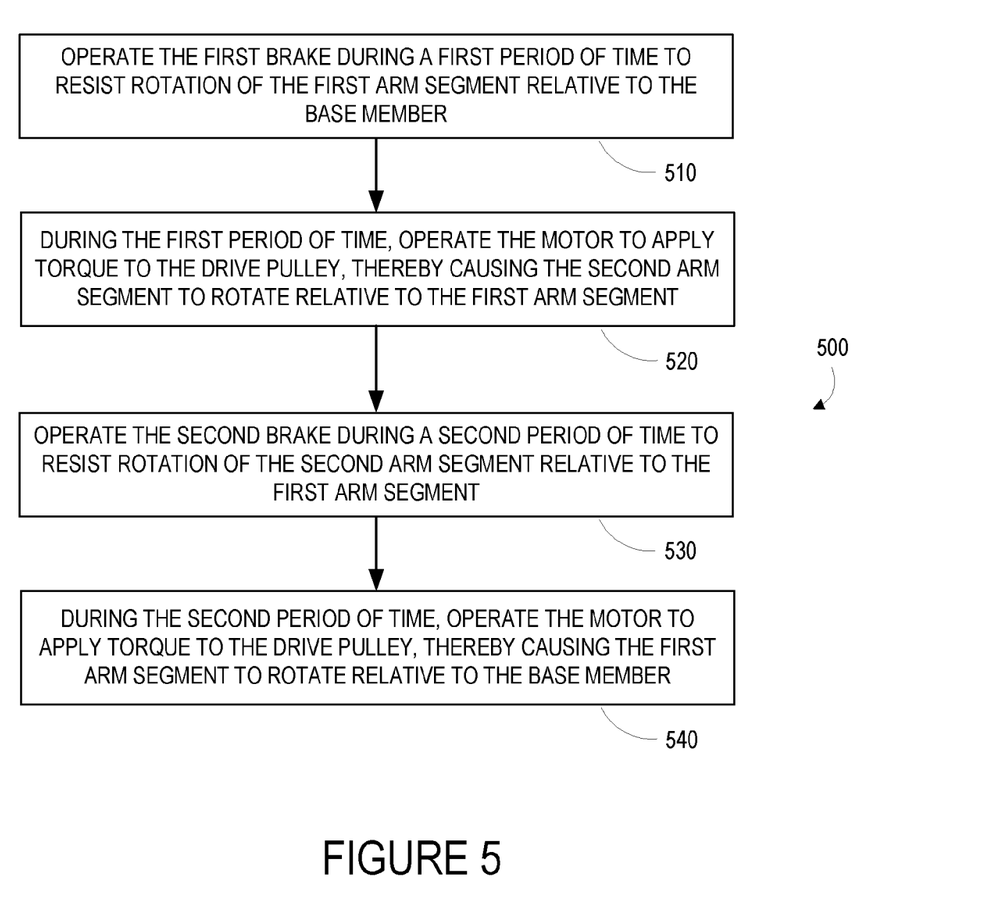
FIG. 5 is a flowchart depicting an example method.

FIG. 5 is a flowchart of a method 500 for operating a system that includes: (i) a base member; (ii) a motor; (iii) a drive pulley, wherein the drive pulley is coupled to the motor such that the motor can apply torque to the drive pulley; (iv) a first arm segment, wherein the first arm segment is coupled to the base member via a first joint, wherein the first joint permits rotation, around a first axis, of the first arm segment relative to the base member; (v) a first brake, wherein the first brake is operable to resist rotation of the first arm segment relative to the base member; (vi) a first hub, wherein the first hub comprises a first first-axis pulley, a second first-axis pulley, and a first-axis shaft, wherein the first-axis shaft rigidly couples the first first-axis pulley to the second first-axis pulley, and wherein the first first-axis pulley, the second first-axis pulley, and the first-axis shaft are coaxial with the first axis; (vii) a first belt, wherein the first belt is in contact with the drive pulley and the first first-axis pulley; (viii) a second arm segment, wherein the second arm segment is coupled to the first arm segment via a second joint, wherein the second joint permits rotation, around a second axis, of the second arm segment relative to the first arm segment; (ix) a second brake, wherein the second brake is operable to resist rotation of the second arm segment relative to the first arm segment; (x) a second hub, wherein the second hub comprises a first second-axis pulley and a second-axis shaft, wherein the first second-axis pulley is rigidly coupled to the second-axis shaft, and wherein the first second-axis pulley and the second-axis shaft are coaxial with the second axis; and (xi) a second belt, wherein the second belt is in contact with the second first-axis pulley and with the first second-axis pulley. The method 500 includes operating the first brake during a first period of time to resist rotation of the first arm segment relative to the base member (510). The method 500 additionally includes, during the first period of time, operating the motor to apply torque to the drive pulley, thereby causing the second arm segment to rotate relative to the first arm segment (520). The method 500 additionally includes operating the second brake during a second period of time to resist rotation of the second arm segment relative to the first arm segment (530). The method 500 additionally includes, during the second period of time, operating the motor to apply torque to the drive pulley, thereby causing the first arm segment to rotate relative to the base member (540).

The method 500 could include additional steps or features. For example, the method 500 could include operating additional brakes of additional joints so as to control a manipulator arm having more than two joints. In some examples, the motor could be used to drive and/or provide power to system(s) at the end of a manipulator arm (e.g., to a drill, screwdriver, hydraulic pump, or other tool at the end of the arm) by operating brakes to resist rotation of all of the joints of the arm, thereby transmitting the rotation/torque from the motor to the system(s) at the end of a manipulator arm.

V. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A robotic arm system comprising:
   a base member;
   a first arm segment, wherein the first arm segment is coupled to the base member via a first joint, wherein the first joint permits rotation, around a first axis, of the first arm segment relative to the base member;
   a first brake, wherein the first brake is selectively operable to resist rotation of the first arm segment relative to the base member;
   a first hub, wherein the first hub comprises a first first-axis pulley, a second first-axis pulley, and a first-axis shaft, wherein the first-axis shaft rigidly couples the first first-axis pulley to the second first-axis pulley, and wherein the first first-axis pulley, the second first-axis pulley, and the first-axis shaft are coaxial with the first axis;
   a first belt, wherein the first belt is in contact with the first first-axis pulley;
   a second arm segment, wherein the second arm segment is coupled to the first arm segment via a second joint, wherein the second joint permits rotation, around a second axis, of the second arm segment relative to the first arm segment;
   a second brake, wherein the second brake is selectively operable to resist rotation of the second arm segment relative to the first arm segment;
   a second hub, wherein the second hub comprises a first second-axis pulley and a second-axis shaft, wherein the first second-axis pulley is rigidly coupled to the second-axis shaft, wherein the first second-axis pulley and the second-axis shaft are coaxial with the second axis, wherein the first arm segment is coupled to the second hub via a first bearing, and wherein the second arm segment is coupled to the second hub via a second bearing; and
   a second belt, wherein the second belt is in contact with the second first-axis pulley and with the first second-axis pulley.

2. The robotic arm system of claim 1, further comprising:
   a third arm segment, wherein the third arm segment is coupled to the second arm segment via a third joint, wherein the third joint permits rotation, around a third axis, of the third arm segment relative to the second arm segment, wherein the second hub further comprises a second second-axis pulley, wherein the second second-axis pulley is rigidly coupled to the second-axis shaft, and wherein the second second-axis pulley is coaxial with the second axis;
   a third brake, wherein the third brake is selectively operable to resist rotation of the third arm segment relative to the second arm segment;
   a third hub, wherein the third hub comprises a third-axis pulley and a third-axis shaft, wherein the third-axis pulley is rigidly coupled to the third-axis shaft, and wherein the third-axis pulley and the third-axis shaft are coaxial with the third axis; and
   a third belt, wherein the third belt is in contact with the second second-axis pulley and with the third-axis pulley.

3. The robotic arm system of claim 1, wherein the second-axis shaft is rigidly coupled to the second arm segment.

4. The robotic arm system of claim 1, further comprising:
   a motor; and
   a drive pulley, wherein the first belt is in contact with the drive pulley, and wherein the drive pulley is coupled to the motor such that the motor can apply torque to the drive pulley.

5. The robotic arm system of claim 4, further comprising:
   a controller that is operably coupled to the motor, wherein the controller comprises one or more processors, and wherein the controller is configured to perform controller operations comprising:
   operating the first brake to resist rotation of the first arm segment relative to the base member while operating the motor to apply torque to the drive pulley, thereby causing the second arm segment to rotate relative to the first arm segment; and
   subsequently operating the second brake to resist rotation of the second arm segment relative to the first arm segment while operating the motor to apply torque to the drive pulley, thereby causing the first arm segment to rotate relative to the base member.

6. The robotic arm system of claim 5, wherein the controller operations further comprise:
   subsequent to operating the second brake to resist rotation of the second arm segment relative to the first arm segment while operating the motor to apply torque to the drive pulley, operating the first brake to resist rotation of the first arm segment relative to the base member while operating the second brake to resist rotation of the second arm segment relative to the first arm segment.

7. The robotic arm system of claim 5 wherein the controller operations further comprise:
   subsequent to operating the second brake to resist rotation of the second arm segment relative to the first arm segment while operating the motor to apply torque to the drive pulley, operating the first brake to permit rotation of the first arm segment relative to the base member and operating the second brake to permit rotation of the second arm segment relative to the first arm segment.

8. The robotic arm system of claim 5, wherein the controller operations further comprise:
   subsequent to operating the second brake to resist rotation of the second arm segment relative to the first arm segment while operating the motor to apply torque to the drive pulley, operating the first brake to reduce rotation of the first arm segment relative to the base member and operating the second brake to reduce rotation of the second arm segment relative to the first arm segment.

9. A robotic arm system comprising:
a base member;
a first arm segment, wherein the first arm segment is coupled to the base member via a first joint, wherein the first joint permits rotation, around a first axis, of the first arm segment relative to the base member;
a first brake, wherein the first brake is selectively operable to resist rotation of the first arm segment relative to the base member, wherein the first brake is an electrostatic brake that comprises a plurality of alternating electrodes, wherein a first subset of the plurality of alternating electrodes is rigidly coupled to the base member, and wherein a second subset of the plurality of alternating electrodes is rigidly coupled to the first arm segment;
a first hub, wherein the first hub comprises a first first-axis pulley, a second first-axis pulley, and a first-axis shaft, wherein the first-axis shaft rigidly couples the first first-axis pulley to the second first-axis pulley, and wherein the first first-axis pulley, the second first-axis pulley, and the first-axis shaft are coaxial with the first axis;
a first belt, wherein the first belt is in contact with the first first-axis pulley;
a second arm segment, wherein the second arm segment is coupled to the first arm segment via a second joint, wherein the second joint permits rotation, around a second axis, of the second arm segment relative to the first arm segment;
a second brake, wherein the second brake is selectively operable to resist rotation of the second arm segment relative to the first arm segment;
a second hub, wherein the second hub comprises a first second-axis pulley and a second-axis shaft, wherein the first second-axis pulley is rigidly coupled to the second-axis shaft, and wherein the first second-axis pulley and the second-axis shaft are coaxial with the second axis; and
a second belt, wherein the second belt is in contact with the second first-axis pulley and with the first second-axis pulley.

10. The robotic arm system of claim 9, wherein at least two electrodes of the plurality of alternating electrodes are patterned to facilitate operating the at least two electrodes to detect an angle of the first joint.

11. The robotic arm system of claim 1, further comprising:
an electrical interconnect that spans the first joint from the base member to the first arm segment, wherein the electrical interconnect comprises a flexible cable that encircles the first axis at least two times.

12. The robotic arm system of claim 1, wherein the second first-axis pulley comprises a first half-pulley and a second half-pulley, wherein the second belt has a first end and a second end, wherein the first end of the second belt is affixed to the first half-pulley, wherein the second end of the second belt is affixed to the second half-pulley, and wherein an angle between the first half-pulley and the second half-pulley is adjustable, thereby adjusting a tension of the second belt.

13. The robotic arm system of claim 1, further comprising:
a fourth belt, wherein the fourth belt is in contact with the second first-axis pulley and with the first second-axis pulley.

14. A robotic arm system comprising:
a base member;
a first arm segment, wherein the first arm segment is coupled to the base member via a first joint, wherein the first joint permits rotation, around a first axis, of the first arm segment relative to the base member;
a first brake, wherein the first brake is selectively operable to resist rotation of the first arm segment relative to the base member;
a first hub, wherein the first hub comprises a first first-axis pulley, a second first-axis pulley, and a first-axis shaft, wherein the first-axis shaft rigidly couples the first first-axis pulley to the second first-axis pulley, and wherein the first first-axis pulley, the second first-axis pulley, and the first-axis shaft are coaxial with the first axis;
a first belt, wherein the first belt is in contact with the first first-axis pulley;
a second arm segment, wherein the second arm segment is coupled to the first arm segment via a second joint, wherein the second joint permits rotation, around a second axis, of the second arm segment relative to the first arm segment;
a second brake, wherein the second brake is selectively operable to resist rotation of the second arm segment relative to the first arm segment;
a second hub, wherein the second hub comprises a first second-axis pulley and a second-axis shaft, wherein the first second-axis pulley is rigidly coupled to the second-axis shaft, and wherein the first second-axis pulley and the second-axis shaft are coaxial with the second axis;
a second belt, wherein the second belt is in contact with the second first-axis pulley and with the first second-axis pulley; and
a third brake, wherein the third brake is selectively operable to resist rotation of the first arm segment relative to the base member, and wherein the first brake and the third brake are electrostatic brakes that comprise respective subsets of a plurality of alternating electrodes, wherein a first subset of the plurality of alternating electrodes is rigidly coupled to the base member, and wherein a second subset of the plurality of alternating electrodes is rigidly coupled to the first arm segment.

15. A method for operating a system, wherein the system comprises:
a base member;
a motor;
a drive pulley, wherein the drive pulley is coupled to the motor such that the motor can apply torque to the drive pulley;
a first arm segment, wherein the first arm segment is coupled to the base member via a first joint, wherein the first joint permits rotation, around a first axis, of the first arm segment relative to the base member;
a first brake, wherein the first brake is selectively operable to resist rotation of the first arm segment relative to the base member;
a first hub, wherein the first hub comprises a first first-axis pulley, a second first-axis pulley, and a first-axis shaft, wherein the first-axis shaft rigidly couples the first first-axis pulley to the second first-axis pulley, and wherein the first first-axis pulley, the second first-axis pulley, and the first-axis shaft are coaxial with the first axis;
a first belt, wherein the first belt is in contact with the drive pulley and the first first-axis pulley;

a second arm segment, wherein the second arm segment is coupled to the first arm segment via a second joint, wherein the second joint permits rotation, around a second axis, of the second arm segment relative to the first arm segment;

a second brake, wherein the second brake is selectively operable to resist rotation of the second arm segment relative to the first arm segment;

a second hub, wherein the second hub comprises a first second-axis pulley and a second-axis shaft, wherein the first second-axis pulley is rigidly coupled to the second-axis shaft, wherein the first second-axis pulley and the second-axis shaft are coaxial with the second axis, wherein the first arm segment is coupled to the second hub via a first bearing, and wherein the second arm segment is coupled to the second hub via a second bearing; and a second belt, wherein the second belt is in contact with the second first-axis pulley and with the first second-axis pulley;

and wherein the method comprises:

operating the first brake during a first period of time to resist rotation of the first arm segment relative to the base member;

during the first period of time, operating the motor to apply torque to the drive pulley, thereby causing the second arm segment to rotate relative to the first arm segment;

operating the second brake during a second period of time to resist rotation of the second arm segment relative to the first arm segment; and during the second period of time, operating the motor to apply torque to the drive pulley, thereby causing the first arm segment to rotate relative to the base member.

16. The method of claim 15, additionally comprising one of:

(i) during a third period of time, operating the first brake to resist rotation of the first arm segment relative to the base member and operating the second brake to resist rotation of the second arm segment relative to the first arm segment;

(ii) during a third period of time, operating the first brake to permit rotation of the first arm segment relative to the base member and operating the second brake to permit rotation of the second arm segment relative to the first arm segment; or (iii) during a third period of time, operating the first brake to reduce rotation of the first arm segment relative to the base member and operating the second brake to reduce rotation of the second arm segment relative to the first arm segment.

17. The method of claim 15, wherein the first period of time and the second period of time have respective durations that are each less than 100 milliseconds.

18. The method of claim 15, wherein the first brake is an electrostatic brake that comprises a plurality of alternating electrodes, and wherein the method further comprises:

using at least two electrodes of the plurality of alternating electrodes to detect an angle of the first joint.

19. The method of claim 18, wherein using the at least two electrodes of the plurality of alternating electrodes to detect an angle of the first joint comprises detecting a capacitance between electrodes of the at least two electrodes.

20. The robotic arm system of claim 1, wherein a direction of the first axis is within fifteen degrees of a direction of a long axis of the first arm segment.

* * * * *